United States Patent [19]

Weilenmann

[11] 4,426,588
[45] Jan. 17, 1984

[54] WEIGHTING CIRCUIT FOR AN ELECTRICAL TORQUE SIGNAL IN A DRILLING MACHINE

[75] Inventor: Walter Weilenmann, Schaanwald, Liechtenstein

[73] Assignee: Hilti Aktiengesellschaft, Schaan, Liechtenstein

[21] Appl. No.: 396,036

[22] Filed: Jul. 7, 1982

[30] Foreign Application Priority Data

Jul. 17, 1981 [DE] Fed. Rep. of Germany ....... 3128410

[51] Int. Cl.$^3$ ............................................. H01H 35/00
[52] U.S. Cl. ...................................... 307/124; 307/350
[58] Field of Search ............... 307/119, 120, 124, 141, 307/141.4, 350; 318/487

[56] References Cited

U.S. PATENT DOCUMENTS 4,030,010 6/1977 Schwartz ........................ 307/141.4

OTHER PUBLICATIONS

"FET Databook" National Semiconductor, Santa Clara, CA., 1977, pp. 6-26-6-36.
"Linear Applications, vol. 1", National Semiconductor, Santa Clara, Calif., 1973, AN-63, pp. 1-12.

Primary Examiner—Elliot A. Goldberg
Assistant Examiner—D. S. Jennings
Attorney, Agent, or Firm—Toren, McGeady and Stanger

[57] ABSTRACT

A weighting circuit operates to process a torque signal which may be produced by a strain gauge located within the handle of a drilling machine. The circuit includes a first sensor device for receiving the torque signal, and an integrator which integrates the torque signal when the amplitude of the torque signal exceeds a certain level as determined by the first sensor device. The output of the integrator is applied to a second sensor device which operates to switch off the machine when a predetermined integration value produced by the integrator is exceeded. The torque signal thus can be evaluated very thoroughly with the present circuit, so that improved control over the response of a drilling machine during blocking, jamming or twisting conditions, can be obtained.

12 Claims, 4 Drawing Figures

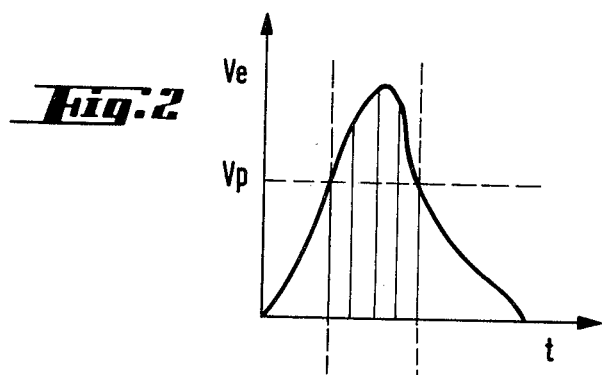
Fig. 2
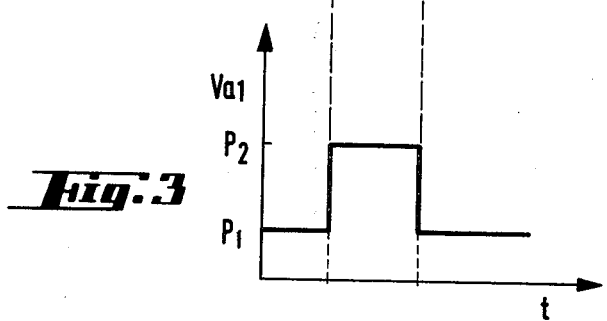
Fig. 3
Fig. 4
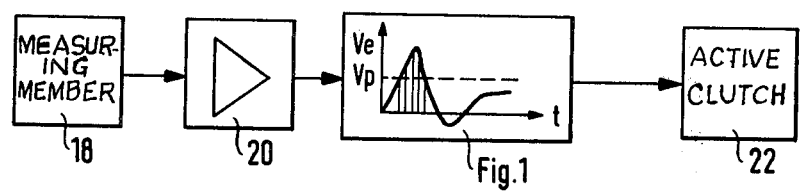

WEIGHTING CIRCUIT FOR AN ELECTRICAL TORQUE SIGNAL IN A DRILLING MACHINE

BACKGROUND OF THE INVENTION

The present invention relates to a weighting circuit for an electrical torque signal developed by a hand tool or machine, particularly a drilling machine, having a first sensor device for comparing the amplitude of the torque signal with a predetermined level, wherein a trigger signal is produced by the circuit when the predetermined level is exceeded. The trigger signal then serves to switch off the machine. Such a circuit is known generally from DE-OS 24 42 260.

What is referred to below as an electrical torque signal is primarily an electrical signal which is produced by an error sensing device upon conversion of a mechanical value corresponding to torque developed in a machine, which electrical signal may possibly be further processed (for example, through an amplifier). Such electrical signal basically may be one like that produced, for example, by a foil or resistance strain gauge between the handle and the housing of a drilling machine. However, signals from an accelerometer or similar devices, which are produced by a sudden rotational movement of a drill housing caused, for example, by blocking of the tool, are also comprehended in this context. Through double integration, the acceleration signal of the accelerometer may be converted into a distance/time signal, and only then coupled to a weighting circuit.

In DE-OS 24 42 260, a signal is developed by a foil strain gauge arranged between the handle and the housing of a drilling machine so that the strain gauge serves as a torque measuring member. The developed signal influences the motor of the drilling machine and switches it off when a certain signal level is exceeded.

The circuit disclosed in DE-OS 24 42 260, however, does not sufficiently allow for complicated, practical conditions, so that random triggerings and failure of triggering often occur.

On the one hand, for example, blocking of a tool in approximately 10 ms can occur in a drilling machine during lateral drilling of a reinforcing iron, e.g., with a recess cutter, which time is less than the reaction time of the user, even for an anticipated occurrence (200–250 ms). Thus, in this case, the circuit and the active system influenced by the circuit (e.g., a clutch or coupling) must respond promptly enough so that an injury is avoided safely.

On the other hand, simple jamming of the tool can arise, which jamming occurs during every half revolution of the tool, but which should not lead every time to interruption of a drilling operation after a deliberate or conscious reaction of the user. After thorough measurements and observations were carried out, it was discovered that the initial occurrence of jamming is reflected by a relatively high but narrow torque peak. This arises because the handle is loosely held. In the event of jamming, the handle rebounds severely against the mass of the user's hand and arm. After the muscles are tensed, the transmission of force to the machine handle-hand-arm combination is cushioned and damped. Torque peaks which are weaker than the initial peak then occur. A practical trigger circuit therefore should also be able to allow for this torque characteristic. The rise time, (i.e., the time during which an edge of the tool is engaged with, e.g., a reinforcing iron during which time the increased torque acts), is approximately 120 ms during jamming.

Furthermore, so-called "twisting", i.e., a torque increase on the machine handle, can also occur with a relatively long rise time of 1000 ms. This arises, for example, through tangential drilling on iron, inhomogeneities in concrete, or poor guiding of the machine. The trigger circuit thus should allow a certain amount of twisting, but should nevertheless respond to a sudden blocking or severe overload.

SUMMARY OF THE INVENTION

The present invention provides a weighting circuit of the type discussed above, which allows for the many operating conditions of a device whose torque changes rapidly due to ordinary disturbances during operation, in particular a drilling machine, and which circuit nevertheless provides a trigger signal reliably in case of danger without unnecessary activation during the ordinary disturbances which are relatively brief or transitory in nature.

Operation of the present circuit is achieved through an improvement of the known circuits by the use of an integrator which integrates the torque signal in response to the output signal of a first sensor device, and a second sensor device for comparing the amplitude of the output signal of the integrator with a predetermined level, so that a triggering signal is produced in accordance with the output signal of the second sensor device.

What is referred to below as a sensor device for comparing the amplitude of the torque signal with a predetermined level is, primarily, a sensor device which produces a discrete signal according to whether the signal to be compared lies above or below the predetermined level. The sensor device also can be understood to be a device whose output signal depends not only on the direction, but also on the value of the difference between the signal to be compared and the predetermined level. In addition to serving to start and discontinue the integration of the torque signal, the output signal of the first sensor device may also serve to alter the time constants and/or the integration constants.

What is referred to as a trigger signal is a signal which triggers a certain action in the device with which the present weighting circuit is used (e.g., a drilling machine) by, for example, switching off the device motor or actuating a clutch, or initiating such actions during the occurrence of the trigger signal.

The circuit according to the invention has, in particular, the advantage that a protective circuit, particularly for a drilling machine, can be realized with simple components but is nevertheless considerably better adapted to practical operating conditions.

The first sensor device preferably comprises a first operational amplifier having an inverting input to which the torque signal is applied, and a non-inverting input which is connected to a first variable voltage divider and, through a resistor, to the output of the first operational amplifier.

The arrangement has the advantage that, so long as the signal on the non-inverting input is below a level determined by the variable voltage divider, the output signal of the operational amplifier remains at a first level, while when the level determined by the voltage divider is exceeded, the output signal is at a second level. With the aid of the discrete output level of the operational amplifier, an integrator can be arranged to be switched ON or OFF, and/or cancelled.

The second sensor device preferably comprises a second operational amplifier having an inverting input to which is applied an output signal from the integrator, and a non-inverting input which is connected to a second variable voltage divider and, through a resistor, to the output of the second operational amplifier. This arrangement has the advantage that, by a change in level at the output of the second operational amplifier, a switching process, e.g., the switching-off of a drilling machine or the actuation of a clutch, can be carried out or initiated. The similar arrangement of the two comparing devices simplifies and makes less expensive the overall circuit construction, as well.

The integrator preferably integrates the torque signal during the time in which the signal exceeds the level determined by the first variable voltage divider. This arrangement has the advantage that, when exceeding a certain first preset level recognized as dangerous, the integration, but not the triggering, begins. When falling below the preset level, the integration is immediately discontinued.

As a preferred alternative, when the torque signal exceeds the first preset level, the integration begins and, when the torque signal falls below a second preset level which is lower than the first preset level, the integration is discontinued. This arrangement has the advantage that, when falling below the first preset level, which may only be for a very brief time, the integration is not discontinued so that a continuing signal, which at least still represents a certain disturbance, nevertheless leads to a triggering operation over a long period of time.

The integration value preferably is cancelled at the end of the integration operation. Thus, disturbances which, however, are not so considerable that they should lead to a triggering, do not add up over a long period of time. Such a manner of switching can be chosen especially when experienced users operate the device or tool. The cancelling of the integration value preferably is achieved by way of a resistor.

In an alternative preferred embodiment, the integration value also is stored after the integration is discontinued. This can be accomplished either by not cancelling the integration value, or by providing a separate storing device for the value and thereafter processing it. In this way, one can also recognize operating conditions which, in particular instances, may not yet lead to triggering but, when added up, can nevertheless damage the device.

Preferably, the integrator comprises an integrating capacitor having terminals which are connected by a switch device which is controlled by the output signal of the first sensor device. This arrangement represents a simple and precise solution in terms of circuit technology whereby it is insured that the integrating capacitor is discharged after each termination of the integration operations. The switch device preferably comprises an FET. This enables a sure discharge of the capacitor, particularly in response to a step signal from the first sensor device.

It is especially preferred that the integrator be arranged as an inverse integrator. This has the advantage that when the output signal of the sensor device is utilized for the short-circuiting or isolation of the terminals of the integrating capacitor, the input signal (torque signal) can be applied constantly to the input of the integrator. With a short-circuited capacitor, a null signal then lies on the output of the operational amplifier of the inverse integrator. Furthermore, the circuit can be further unified, and thus made less expensive, through the use of a third operational amplifier.

It is preferable that several first sensor devices be provided which are adjusted to various levels, and which first sensor devices alter the time constant of the integrator as soon as each of their preset levels is exceeded by the level of the torque signal. This has the advantage that the details of the shape of the torque signal can be better comprehended and correspondingly evaluated. The control of the integrator by way of altering the time constant is, in addition, an especially desirable possibility.

It is also preferable that several integrators be provided for the integration of the torque signal, each with an accompanying (or several if necessary, see above) first sensor device, wherein the preset levels of the sensor devices are adjusted differently. This has the advantage that individual types of disturbances, in particular blocking, twisting and jamming, can be very well distinguished, and that the device is safely switched off by the circuit through a parallel triggering arrangement when exceeding only one critical value representing a particular disturbance.

It is preferable that the integrator, or integrators, be of a high-speed type. Such an integrator is especially suitable for disturbances with very steep increases in force, e.g., on the handle of the device with which the present circuit is used. Such a disturbance may be a blocking condition. An integrator adjusted for jamming or twisting can react relatively slowly. It is preferable that a first sensor device having a higher preset comparing level be associated with the high-speed integrator.

The high-speed integrator discussed above has a very short rise time, so that an active coupling or clutch can be actuated very quickly if necessary. Switching-on disturbances in a drilling hammer, and interfering fields, however, must not result in a switching-off condition. The amplitude of these disturbances can also reach a higher level which would result, without integration, in actuation of the active coupling. Since these peaks are very narrow, however, a correspondingly compensated integrator will not attain the triggering voltage for the second sensor device.

For a better understanding of the present invention, reference is made to the following description and accompanying drawings, while the scope of the present invention will be pointed out in the appended claims.

BRIEF DESCRIPTION OF THE DRAWING

In the drawing:

FIG. 2 represents an example of an input signal applied to the circuit of FIG. 1;

FIG. 3 represents an output signal of a first sensor device in the circuit of FIG. 1; and FIG. 4 is a block diagram of a system in which the present circuit may be used according to the invention.

DETAILED DESCRIPTION OF THE INVENTION

Figure 1:
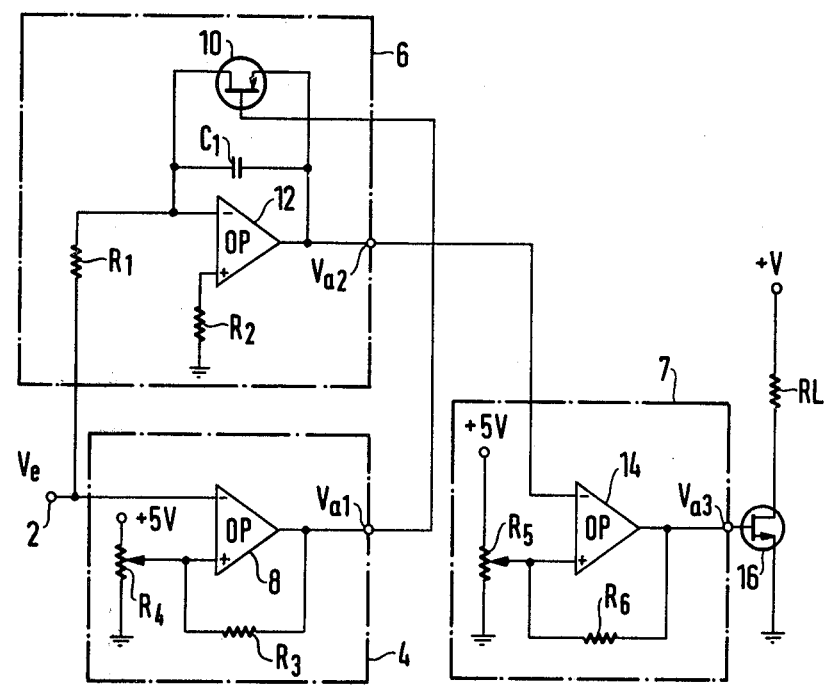
FIG. 1 is an electrical schematic diagram of a preferred embodiment of a weighting circuit according to the invention.

A variable torque signal $V_e$, shown by way of example in FIG. 2, is applied to an input terminal 2 shown in FIG. 1. The terminal 2 is connected to a sensor device 4, as well as to an integrator 6.

The sensor device 4 includes an operational amplifier 8 having an inverting input (−)(N-input) to which the signal $V_e$ of FIG. 2 is applied. The output of the operational amplifier 8 is fed back through a resistor $R_3$,(e.g., 1 MΩ) to the non-inverting input (+) (P-input) of the operational amplifier 8. The input (+) is further connected to a variable voltage divider $R_4$ (e.g., 100 kΩ), which, in turn, is connected between a positive voltage (e.g., 5 V) and ground. Through the adjustment of a tap on the divider $R_4$, a predetermined level $V_p$ (FIG. 2) of the input signal $V_e$ is set, below which predetermined level $V_p$ an output signal $V_{al}$ (FIG. 3) of the operational amplifier 8 is maintained at a first level $P_1$. When the input signal $V_e$ rises above the level $V_p$, $V_{al}$ jumps to $P_2$. Values occurring in practice for $V_e$ are, e.g., 5 V, and 2 V for $V_p$.

The output signal $V_{al}$ of the operational amplifier 8 is applied to the gate of an FET 10, as shown in FIG. 1. Here, specifically, a P-FET (pnp-FET) has its channel open at the level $P_1$ of the output signal $V_{al}$, while the channel is blocked at the level $P_2$ of the output signal $V_{al}$.

The FET 10 bypasses a capacitor $C_1$ which has its terminals connected between the output and the N-input of a second operational amplifier 12. The N-input of amplifier 12 is, moreover, connected to the signal input 2 by a resistor $R_1$, so that the signal $V_{e2}$ to be weighted is applied through $R_1$ to the N-input of amplifier 12.

The P-input of the second operational amplifier 12 is connected to chassis ground through a resistor $R_2$. The resistor $R_2$ provides input bias current compensation.

The output of the second operational amplifier 12 is connected to the inverting (N−) input of a third operational amplifier 14. The third operational amplifier 14 is part of a second sensor device 7, and is arranged in the second sensor device 7 in a manner similar to the first operational amplifier 8 in the first sensor device 4. That is, the output of the third operational amplifier 14 is connected to its P-input through a resistor $R_6$ (e.g., 1 MΩ), and the P-input in turn is connected to tap a voltage on a divider resistor $R_5$ (e.g., 100 kΩ) which is connected between a positive voltage (e.g., +5 V) and the chassis ground.

The output of the third operational amplifier 14 is connected to a switch, namely, the gate of an FET 16. The FET 16 lies in the current path of a load RL, for example, a magnetic coupling or clutch, which is to be switched on or off by the weighting circuit.

The manner in which the present circuit operates is as follows. Should the amplitude of the signal to be weighted be below the level $V_p$ determined by the adjustment of resistor $R_4$, then the output of the operational amplifier 8 is at the low level $P_1$ which does not block the FET 10. The capacitor $C_1$ is thereby short-circuited and the integrating capacitor 6 acts like a degenerative operational amplifier with a transfer impedance of zero, i.e., the amplification is zero and the output signal of the amplifier 12 is likewise zero, whether or not the input signal $V_e$ is applied through $R_1$ constantly to the N-input of the operational amplifier 12.

However, should $V_e$ (t) climb above $V_p$, then the output signal $V_{al}$ of the operational amplifier 8 jumps to value $P_2$ which suffices to block the FET 10.

The circuit 6 now acts as an integrator and integrates the input signal $V_e$. Should the signal $V_e$ again fall beneath the level $V_p$, then the output signal $V_{al}$ falls back to the level $P_1$ so that the channel of FET 10 opens, capacitor $C_1$ discharges and the output signal $V_{a2}$ becomes zero. During the integration time, the output signal $V_{a2}(t)$ of the circuit 6 is constantly compared by the level detector circuit 7 with the level set by the adjustment of the tap on resistor $R_5$. As soon as the level set by $R_5$ is exceeded, the circuit 7 produces a signal $V_{a3}$ at a level which suffices to open the channel of FET 16 which was previously blocked, and which triggers a flow of current through load RL. The FET 16, which can also be replaced by a relay, if necessary, allows a greater capacity of electrical switching. An active system, for example, a magnetic coupling or clutch, thus can be actuated.

A brief response time of the active system, given through physiological conditions (reaction time of the user), of a maximum of 30 ms is important here. Within the time indicated, of course, the weighting must be carried out and the decision made, as well. This is achieved by the present circuit.

It should be noted that the arrangement according to the invention is also usable with other devices and, if necessary, with automatic drilling tools not guided by hand, or similar devices, in which a disturbance is to be recognized from the course of, e.g., the torque whereupon the device is then switched off.

It is preferable that several sensor or level measurement devices 8, $8_1$, ... $8_n$, etc. be provided (only the device 8 appears in FIG. 1), which devices are then adjusted suitably to the various respective levels through their associated resistors $R_4$, $R_{41}$, ... $R_{4n}$, etc. It is then possible in a corresponding manner, as through the use of the FET 10, to switch on or switch off additional capacitors $C_{11}$ ... $C_{1n}$, etc. (not shown) and/or additional resistors $R_{11}$ ... $R_{1n}$, etc. (not shown) in addition to capacitor $C_1$ and resistor $R_1$, so that the time constants $1/R(\text{or } R_{1i}) \cdot C(\text{or } C_{1k})$ can also be influenced in accordance with the amplitude of signal $V_e$.

FIG. 4 is a block diagram of the connection of the weighting circuit shown in FIG. 1, in an instantaneous control arrangement for a drilling machine.

A signal is provided to an amplifier 20 (or another processing circuit) from a discriminating member 18, e.g., a foil or resistance strain gauge, an accelerometer or the like which converts a mechanical value developed in the machine into an electrical signal as free of delay as possible. The output signal of the amplifier 20 is applied to the circuit shown in FIG. 1 and described above. The illustrated shape of the curve in FIG. 4, which corresponds to an actual force curve on the handle of the machine, makes clear that negative forces can also occur through the effect of force on the hand-arm system and the consequent reaction. By way of the control logic of the circuit of FIG. 1, the resulting control signal is provided to an active system, e.g., an active clutch 22, which can correspond to the part RL in FIG. 1.

While embodiments of the invention have been shown and described in detail, it will be evident to those skilled in the art that the invention may be otherwise embodied without departing from its spirit and scope.

What is claimed is:

1. A weighting circuit for providing a trigger signal in response to a torque signal corresponding to torque developed in a hand tool, wherein the trigger signal influences operation of the tool, comprising first sensor means for comparing the amplitude of the torque signal with a first predetermined level and for providing an output signal when the amplitude of the torque signal exceeds the first predetermined level, integrator means for integrating the torque signal in response to the output signal of the first sensor means and for producing an integration value, second sensor means for comparing the integration value from said integrator means with a second predetermined level and for providing a corresponding output signal, and means for producing the trigger signal in response to the output of said second sensor means, wherein said first sensor means includes a first variable voltage divider, a first operational amplifier having an inverting input for receiving said torque signal and a non-inverting input coupled to said first variable voltage divider, and a first resistor coupled between said non-inverting input and the output of said first operational amplifier.

2. A weighting circuit according to claim 1, wherein said second sensor means includes a second variable voltage divider, a second operational amplifier having an inverting input coupled to the output of said integrator means and a non-inverting input coupled to said second variable voltage divider, and a second resistor coupled between the non-inverting input and the output of said second operational amplifier.

3. A weighting circuit according to claim 1, wherein said integrator means operates to integrate said torque signal during the time when said torque signal exceeds said first predetermined level of said first sensor means.

4. A weighting circuit according to claim 1, wherein said first sensor means and said integrator means are arranged so that said integrator means begins to operate when said torque signal exceeds said first predetermined level and said integrator means ceases to operate when said torque signal drops below a certain level which is lower than said first predetermined level.

5. A weighting circuit according to claim 1, wherein said integrator means includes means for cancelling the integration value produced by said integrator means when the operation of said integrator means is terminated by said first sensor means.

6. A weighting circuit according to claim 1, including means for storing the integration value produced by said integrator means after the operation of said integrator means is terminated by said first sensor means.

7. A weighting circuit according to claim 1, wherein said integrator means includes an integrating capacitor, and switch means for connecting the terminals of said capacitor to one another in response to the output signal of said first sensor means.

8. A weighting circuit according to claim 7, wherein said switch means comprises an FET.

9. A weighting circuit according to claim 1, wherein said integrator means is arranged to operate as an inverse integrator.

10. A weighting circuit according to claim 1, including a number of first sensor devices each adjusted to a different first predetermined level for changing the time constant of said integrator means when said torque signal exceeds the first predetermined level of each of said first sensor devices.

11. A weighting circuit according to claim 1, including a number of integrator means for integrating said torque signal, each of said integrator means is associated with one of a number of first sensor devices, and the first predetermined levels of said first sensor devices are set at different values.

12. A weighting circuit according to claim 1, wherein said integrator means includes a high-speed integrator.

* * * * *